3,149,955
METHOD OF COMBATTING UNDESIRABLE
VEGETATION
Adolf Fischer, Mutterstadt, Erich Flickinger, Ludwigshafen (Rhine), Gustav Steinbrunn, Schwegenheim, and Herbert Stummeyer, Mannheim, Germany, assignors to Badische Anilin- & Soda-Fabrik Aktiengesellschaft, Ludwigshafen (Rhine), Germany
No Drawing. Filed Feb. 6, 1961, Ser. No. 87,099
Claims priority, application Germany Feb. 10, 1960
7 Claims. (Cl. 71—2.6)

This invention relates to new urea derivatives which are useful selective herbicides.

Many chemical compounds are known to be injurious to the growth of vegetation and to have a herbicidal effect under specific conditions. It is a rather difficult problem, however, to provide herbicides which are capable of destroying weeds or similar undesirable plants, but are harmless to useful or cultivated vegetation such as vegetables, cereal crops, and the like. While a large number of such compounds are total herbicides, killing all vegetation which comes into contact therewith, relatively few compounds are known to be capable of acting as selective herbicides.

It is known that N-chloro- and N-dichlorophenyl-N'-methyl-N'-propargylureas are effective total herbicides. In general, however, their selective action is unsatisfactory.

It is known that substituted ureas which contain a methoxy group or cycloalkyl radical attached to the nitrogen can be used as selective herbicides in pre-emergence treatment. These ureas have only little selective action, however, if used after emergence of the plants.

Furthermore, various substituted ureas are known which contain n-butyl, sec-butyl or isobutyl groups as substituents. Some of these ureas have only slight herbicidal action or, if their herbicidal action is adequate, they show only little selectivity, i.e., they destroy both weeds and cultivated plants.

It is the primary object of this invention to provide a novel and useful class of herbicides.

Another object of this invention is to provide novel methods of inhibiting the growth of vegetation, especially of undesirable weeds, growing together with useful plants.

A further object of the present invention is to provide novel selective post-emergence herbicides.

We have found that urea derivatives of the formula:

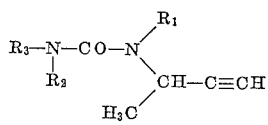

in which $R_1$ denotes an alkyl radical containing 1 to 2 carbon atoms, $R_2$ denotes a hydrogen atom or an alkyl radical containing 1 to 3 carbon atoms, and $R_3$ denotes a cyclohexyl or cyclooctyl group or the group

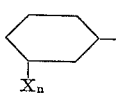

wherein X represents a hydrogen atom, a halogen atom, e.g., a chlorine atom, a hydroxyl group, or an alkyl, alkylene or alkoxy radical containing 1 to 2 carbon atoms and $n$ represents one of the integers 1, 2 and 3, are valuable selective weed killers with short after-effect periods.

In the above formula, $R_1$ may represent, for example, a methyl or ethyl group. The alkyl radical represented by $R_2$ may be, for example, a methyl, ethyl or β-hydroxypropyl group. The alkyl, alkylene or alkoxy radical represented by X may be, for example, a methyl, ethyl, vinyl, methoxy or ethoxy group.

The 1-butine-3-yl group:

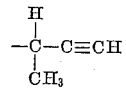

will hereinafter be referred to briefly as the "isobutinyl group."

The said novel urea derivatives can be prepared by conventional methods by reaction of aromatic isocyanates with butinylamines or of aromatic amines with N-alkyl-N-butinylcarbamic acid derivatives, for example with the corresponding chlorides. The reactions may be represented by the following equations:

(Ia)

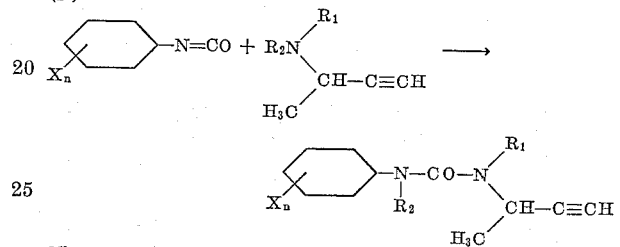

or (IIa)

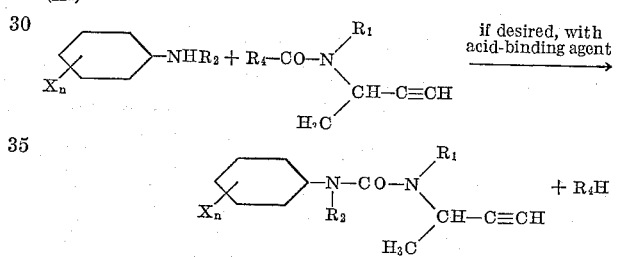

In the foregoing formulae $R_1$, $R_2$, X and $n$ have the meanings given above, and $R_4$ denotes, for example, a halogen atom, e.g., a chlorine or bromine atom.

In accordance with the above equations, N-p-chlorophenyl-N'-methyl-N'-isobutinylurea, for example, can be obtained in the following manners:

(Ib)

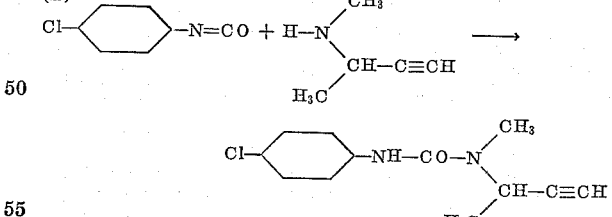

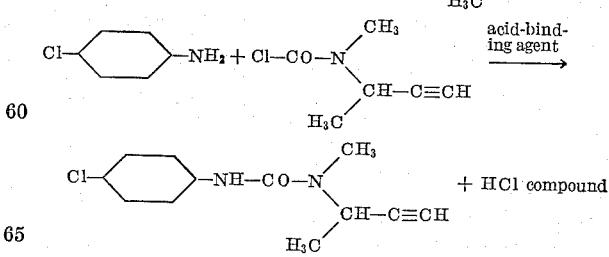

The reaction of aromatic amines with N-alkyl-N-butinyl-carbamic acid derivatives is preferably conducted in the presence of an acid-binding agent. Suitable acid-binding agents are, for example, alkali alcoholates, such as the alcoholates of sodium or potassium with methanol, ethanol or propanol. Other suitable acid-binding agents are, for example, tertiary amines, N,N-dimethylaniline, pyridine, triethylamine, tributylamine, N,N-diethylaniline and quinoline.

In the reaction of aromatic amines with N-alkyl-N-butinylcarbamic acid derivatives, the reaction temperature should not exceed about 100° C. and is preferably between about 20° and 60° C. The reactants may be employed in stoichiometric amounts, but it is also possible to use one of the reactants in excess. The amount of acid-binding agent, if any, may be varied and is preferably the stoichiometric amount required to bind the acid compound which is split off during the reaction.

In the reaction of aromatic isocyanates with butinylamines, the reaction temperature is preferably between 10 and 60° C. This reaction can also be carried out in the gas phase, in which the reaction product must be cooled as rapidly as possible.

The reactions according to Equations I and II above may be carried out in the presence of organic solvents. Suitable organic solvents which are inert under the reaction conditions, i.e., which will not react with one of the reactants, include aromatic hydrocarbons, such as benzene and toluene, and aliphatic compounds and dialkyl ethers, such as dioxane.

Isocyanates suitable for the reaction according to Equation I above include p- and m-chlorophenylisocyanate, 2,4- and 3,4-dichlorophenylisocyanate, p- and m-toluylisocyanate, chlorotoluylisocyanates, m-anisylisocyanate, cyclohexylisocyanate, cyclooctylisocyanate and phenylisocyanate.

The amines can be obtained by reaction of alkylamines with the butinyl chlorides or the toluensulfonic acid butinyl esters or by alkylation of N-butinylurethanes with alkyl sulfates and splitting of these compounds. Amines suitable for reaction with the said phenyl isocyanates are, for example, N - methyl - isobutinylamine and N - ethyl - isobutinylamine.

Aromatic amines which can be reacted with N-alkyl-N-butinylcarbamic acid derivatives include: aniline, m- and p-chloraniline, m- and p-toluidine, m- and p-phenetidines, m- and p-anisidines, m-vinylaniline, p-chloro-m-toluidine, o-chloro-m-toluidine, cyclohexylamines, C - methyl-cyclohexylamine and cyclooctylamine. Suitable N - alkyl - N-butinylcarbamic acid derivatives include: N-methyl-isobutinylcarbamic acid chloride, N-ethyl-isobutinylcarbamic acid chloride, N-methyl-isobutinylcarbamic acid phenyl ester, N-ethyl-isobutinylcarbamic acid phenyl ester and N-methyl-isobutinylcarbamic acid methyl ester.

The new ureas according to the present invention are formed in very good yields. Most of them are crystalline substances. They are readily soluble in many organic solvents, for example in alcohols, ketones, ethyl acetate, tetrahydrofurane or dimethylformamide.

The new urea derivatives are extremely effective as selective herbicides. In contradistinction to the substituted urea compounds hitherto known, the new compounds, for example N - p - chlorophenyl-N'-methyl-N-isobutinylurea, N - 3,4 - dichlorophenyl - N'-methyl-N'-isobutinylurea, N-phenyl-N'-methyl-N'-isobutinylurea, N-m-tolyl-N'-methyl-N' - isobutinylurea, N-m-(vinylphenyl)-N'-methyl-N'-isobutinylurea, N - p - tolyl-N'-methyl-N'-isobutinylurea, N-p-tolyl-N'-methyl-N'-isobutinylurea, N-p-chlorophenyl - N'-ethyl-N'-isobutinylurea, N - cyclohexyl-N'-methyl-N'-isobutinylurea, N - cyclooctyl - N' - methyl-N'-isobutinylurea and N - m - hydroxyphenyl - N' - methyl - N' - isobutinylurea, produce favorable results when used in amounts of 0.1 to 1.5 kilograms of active substance per hectare. The selectivity of the new compounds is particularly conspicious when they are used to combat weeds growing together with cereal crops, such as wheat, rye or barley, or with carrots. The new ureas may also be used without damage for post-emergence treatment, i.e., they may be sprayed over the cultivated plants after they have emerged from the soil.

The urea derivatives may be used in dispersed form or as granulates, if desired together with other weed killers, for example with chloro-(methyl)-phenoxyalkylcarboxylic acid derivatives, higher chlorinated carboxylic acids, such as α,α-dichlorobutyric acid, inorganic salts, such as chlorates or borax, or phenylcarbamic acid esters, depending on the specific purpose for which they are to be used. They may also be used as aqueous dispersions, dissolved in organic liquids, mixed with emulsifiers or, together with dry carriers, as powders.

The compounds according to this invention may be prepared, for example, in the following manners:

15 parts by weight of p-chlorophenylisocyanate dissolved in 24 parts by weight of dry benzene are added, at about 30° C., to 8 parts by weight of N-methyl-N-isobutinylamine dissolved in 60 parts by weight of dry benzene, while stirring and cooling. The reaction mixture is maintained at the same temperature for half an hour. It is then allowed to cool, and the crystalline product is washed with petroleum ether (boiling point 50° to 70° C.) and dried in the air. After recrystallization from diisopropyl ether, 14 parts by weight of N-p-chlorophenyl-N'-methyl-N'-isobutinylurea are obtained. The compound melts at 148.5° to 149° C.

50 parts by weight of about 45% 3,4-dichlorophenyl isocyanate dissolved in diphenyl ether are allowed to drip, at about 35° C., into 10 parts by weight of N-methyl-N-isobutinylamine and 200 parts by weight of ether, while stirring and cooling. The temperature of the reaction mixture (35° to 40° C.) is maintained for one hour. After cooling to about 15° C., the reaction product is filtered off, washed with petroleum ether and dried. 25 parts by weight of N-3,4-dichlorophenyl-N'-methyl-N'-isobutinylurea, melting at 134.5° to 136° C., are obtained.

If phenyl isocyanate is used, N-phenyl-N'-methyl-N'-isobutinylurea is obtained in the same manner. After recrystallization from diisopropyl ether and ethyl acetate, the product has a melting point of 113° to 114.5° C.

From m-tolyl isocyanate and N-methyl-N-isobutinylamine, N-m-tolyl-N'-methyl-N'-isobutinylurea with a melting point of 117° to 118° C. is obtained.

29 parts by weight of methylisobutinylcarbamic acid chloride are allowed to drip, while stirring and at 40° to 45° C., into 27 parts by weight of N-m-aminostyrene and 25 parts by weight of dimethylaniline dissolved in 40 parts by weight of dry toluene. The reaction mixture is then maintained at 45° to 50° C. for 3 hours, then at 50° to 55° C. for 3 hours, and finally at 60° to 65° C. for 3 hours. After cooling, water is added and the mixture is acidified with hydrochloric acid. Then the whole is cooled and the deposited reaction product filtered off by suction and washed with water. After drying, N-m-(vinylphenyl)-N'-methyl-N'-isobutinylurea, which melts at 102° to 103° C., is obtained by recrystallization from diisopropyl ether. In an analogous manner, the following urea derivatives are obtained: N-cyclooctyl-N'-methyl-N'-isobutinylurea with a melting point of 90° to 91° C. by using cyclooctylamine; N-cyclohexyl-N'-methyl-N'-isobutinylurea with a melting point of 99° to 100° C. by using cyclohexylamine; N-m-hydroxyphenyl-N'-methyl-N'-isobutinylurea by using m-aminophenol. The last-mentioned urea derivative is a sirup, analysis of which gave the following result: N found, 12.5%; N calculated, 12.85%.

The following examples illustrate the good herbicidal effect of the new urea derivatives according to this invention.

*Example 1*

Sandy clay soil infested with weeds is placed in a 25 x 30 cm. earthenware dish, and seeds of *Secale cereale* (rye), *Beta vulgaris saccharitea* (sugar beet), *Fagopyrum esculentum* (buckwheat), *Daucus carota* (carrot), *Allium cepa* (onion) and *Sinapis alba* (white mustard) are sown in cross rows in the top layer. Onto the soil thus prepared, N-p-chlorophenyl-N'-methyl-N'-isobutinylurea is sprayed in an amount equivalent to 1 kilogram per hectare in 1000 liters of water as a dispersion, with sodium lignin sulfonate as dispersing agent. After about three weeks, buckwheat, sugar beets, onions and white mustard have withered completely. The carrots and the rye are practically undamaged. Of the emerged weeds, the following have been destroyed: *Chenopodium album* (white goosefoot), *Galinsoga parviflora* (gallant soldier), *Stellaria media* (chickweed) and *Lolium perenne* (English rye grass). Similar results are obtained by using, instead of N-p-chlorophenyl-N'-methyl-N'-isobutinylurea, the following compounds: N-m-vinylphenyl-N'-methyl-N'-isobutinylurea, N - cyclohexyl - N' - methyl-N'-isobutinylurea or N-phenyl-N'-ethyl-N'-isobutinylurea. In an experiment carried out under the same conditions with 1 kilogram per hectare of p-chlorophenyldimethylurea (CMU), the carrots and the rye were also destroyed completely by the active substance.

*Example 2*

N-3,4-dichlorophenyl-N'-methyl - N' - isobutinylurea is dispersed in water with the aid of lignin sulfonate as dispersing agent and sprayed, in amounts equivalent to 5 and 10 kilograms per hectare, on the following full-grown plants: *Avena fatua* (wild oat), *Panicum sanguinale* (fingered pancium), *Lolium perenne* (English rye grass), *Sinapis alba* (white mustard), *Polygonum persicaria* (willow weed), *Galium aparine* (cleavers), *Urtica urens* (small nettle), *Stellaria media* (chickweed) and *Chenopodium album* (white goosefoot). After only a few days, the plants begin to wither from the edges of the leaves and have died completely after about 4 weeks.

Similar results are obtained by using, instead of N-3,4-dichlorophenyl-N'-methyl-N'-isobutinylurea, the following compounds: N-phenyl-N'-ethyl-N'-isobutinylurea, N-phenyl-N'-methyl-N'-isobutinylurea, N-m-tolyl-N'-methyl-N'-isobutinylurea, N - p-tolyl-N'-methyl-N'-isobutinylurea, N-cyclooctyl-N'-methyl-N'-isobutinylurea or N-m-hydroxyphenyl-N'-methyl-N'-isobutinylurea.

We claim:
1. A method of combating undesirable vegetation growing together with useful plants in a cultivated area which comprises applying to said cultivated area as a selective herbicide a urea compound of the formula:

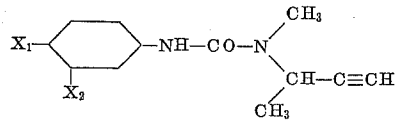

wherein each of $X_1$ and $X_2$ represents a substituent atom selected from the class consisting of hydrogen and chlorine, said herbicide being applied in an amount sufficient to destroy said undesirable vegetation without substantially inhibiting the growth of said useful plants.

2. A method as claimed in claim 1 wherein said herbicide is applied in an amount of 0.1 to 1.5 kilograms of active substance per hectare.

3. A method as claimed in claim 2 wherein carrots are the useful plant in said cultivated area.

4. A method as claimed in claim 2 wherein rye is the useful plant in said cultivated area.

5. A method as claimed in claim 2 wherein the selective herbicide is N - p - chlorophenyl-N'-methyl-N'-isobutinylurea.

6. A method as claimed in claim 2 wherein the selective herbicide is N-3,4-dichlorophenyl-N'-methyl-N'-isobutinylurea.

7. A method as claimed in claim 2 wherein the selective herbicide is N-phenyl-N'-methyl-N'-isobutinylurea.

References Cited in the file of this patent
UNITED STATES PATENTS

| | | |
|---|---|---|
| 2,655,447 | Todd | Oct. 13, 1953 |
| 2,661,272 | Searle | Dec. 1, 1953 |
| 2,867,520 | Beaver et al. | Jan. 6, 1959 |
| 3,035,093 | Beaver et al. | May 15, 1962 |

FOREIGN PATENTS

| | | |
|---|---|---|
| 586,059 | Canada | Oct. 27, 1959 |